US010790082B2

(12) United States Patent
Yoshida et al.

(10) Patent No.: US 10,790,082 B2
(45) Date of Patent: Sep. 29, 2020

(54) REACTOR HAVING BASE HAVING SECURING NOTCHES

(71) Applicant: FANUC CORPORATION, Yamanashi (JP)

(72) Inventors: Tomokazu Yoshida, Yamanashi (JP); Masatomo Shirouzu, Yamanashi (JP); Kenichi Tsukada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 49 days.

(21) Appl. No.: 16/038,221

(22) Filed: Jul. 18, 2018

(65) Prior Publication Data

US 2019/0035537 A1 Jan. 31, 2019

(30) Foreign Application Priority Data

Jul. 25, 2017 (JP) ................................ 2017-143610

(51) Int. Cl.

| | |
|---|---|
| ***H01F 30/12*** | (2006.01) |
| ***H01F 27/30*** | (2006.01) |
| ***H02K 3/46*** | (2006.01) |
| ***H02K 3/32*** | (2006.01) |
| ***H01F 27/26*** | (2006.01) |
| ***H01F 37/00*** | (2006.01) |
| ***H01F 27/06*** | (2006.01) |

(52) U.S. Cl.

CPC ........... *H01F 27/306* (2013.01); *H01F 27/06* (2013.01); *H01F 27/263* (2013.01); *H01F 37/00* (2013.01); *H02K 3/32* (2013.01); *H02K 3/46* (2013.01)

(58) Field of Classification Search

CPC ............................... H01F 27/26; H01F 27/263
USPC .............................................................. 336/5
See application file for complete search history.

(56) References Cited

U.S. PATENT DOCUMENTS

| | | | |
|---|---|---|---|
| 2009/0251266 A1 | 10/2009 | Nieto et al. | |
| 2014/0268896 A1* | 9/2014 | Kurita ..................... | H01F 37/00 363/17 |
| 2016/0365193 A1* | 12/2016 | Af Ekstrom .......... | H01F 27/025 |

FOREIGN PATENT DOCUMENTS

| | | | |
|---|---|---|---|
| CN | 101678744 | A | 3/2010 |
| CN | 104471657 | A | 3/2015 |
| CN | 106158297 | A | 11/2016 |
| CN | 106233404 | A | 12/2016 |
| CN | 107210124 | A | 9/2017 |
| CN | 108305817 | A | 7/2018 |
| CN | 208570266 | U | 3/2019 |
| EP | 1681690 | A2 | 7/2006 |
| JP | H11-67545 | A | 3/1993 |
| JP | H6-34218 | A | 5/1994 |
| JP | H6-34218 | U | 5/1994 |
| JP | H10-41140 | A | 2/1998 |
| JP | 2000-77242 | A | 3/2000 |

(Continued)

*Primary Examiner* — Ronald Hinson
(74) *Attorney, Agent, or Firm* — Hauptman Ham, LLP

(57) ABSTRACT

A reactor according to an embodiment of the present disclosure includes a reactor main body including cores and coils wound on the cores; and a base having a polygonal shape extending outside the reactor main body, configured to support the reactor main body. In at least two sides that are not opposite each other, of a plurality of sides of the base, a plurality of notches are formed inwardly from each of the sides, so that axes of fasteners to temporarily secure the base to an installation target object pass through the notches.

8 Claims, 7 Drawing Sheets

(56) References Cited

FOREIGN PATENT DOCUMENTS

| | | | |
|---|---|---|---|
| JP | 2008-210998 | A | 9/2008 |
| JP | 2011-222741 | A | 11/2011 |
| JP | 2015-76478 | A | 4/2015 |
| WO | 2010/119324 | A2 | 10/2010 |
| WO | 2014/167571 | A1 | 10/2014 |

* cited by examiner

REACTOR HAVING BASE HAVING SECURING NOTCHES

This application is a new U.S. patent application which claims benefit of JP 2017-143610 filed on Jul. 25, 2017, and the content of JP 2017-143610 is incorporated herein by reference.

BACKGROUND OF THE INVENTION

1. Field of the Invention

The present invention relates to a reactor.

2. Description of Related Art

Reactors each have a plurality of iron core coils, and each iron core coil includes an iron core and a coil wound on the iron core. For example, refer to Japanese Unexamined Patent Publication (Kokai) Nos. 2000-77242 and 2008-210998.

In most conventional reactors, securing notches are formed in the base thereof in the same directions as drawing directions of cables.

When a conventional reactor is panel-mounted (wall-mounted), in general, the reactor is temporarily secured by screwing screws through securing notches on a lower side in the direction of gravity, and thereafter the reactor is secured by screwing screws through securing notches on an upper side.

SUMMARY OF THE INVENTION

However, when conventional reactors are panel-mounted in orientations in which the directions of the securing notches are perpendicular to the direction of gravity, due to wiring limitations, the reactors cannot be temporarily secured. It is necessary to secure the reactors by tightening screws on the securing notches while supporting the reactor, thus requiring time and effort for securing. There is also a problem in that more time and effort is required for securing the reactor, when the reactor is larger in size or weight.

A reactor according to an embodiment of the present disclosure includes a reactor main body including cores and coils wound on the cores; and a base having a polygonal shape extending outside the reactor main body, configured to support the main body. In at least two sides that are not opposite each other, of a plurality of sides of the base, a plurality of notches are formed inwardly from each of the sides, so that axes of fasteners to temporarily secure the base to an installation target object pass through the notches.

BRIEF DESCRIPTION OF THE DRAWINGS

The objects, features, and advantages of the present invention will be more apparent from the following description of embodiments accompanying with the drawings. In the drawings.

DETAILED DESCRIPTION OF THE INVENTION

Figure 1:
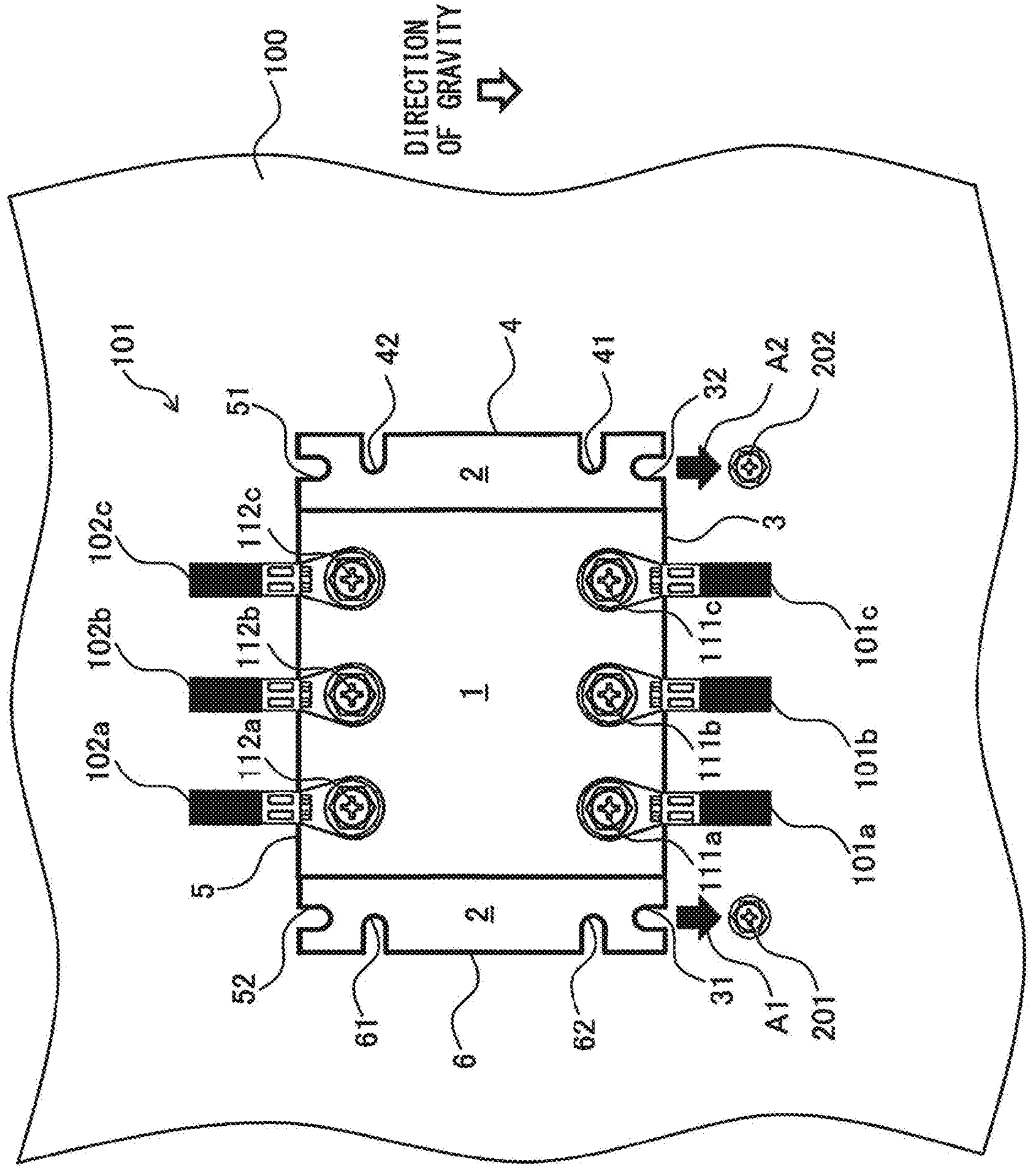
FIG. 1 is a plan view of a reactor according to a first embodiment, when the base is temporarily secured to an installation target object in such an orientation that the drawing directions of the cables are parallel with the direction of gravity.

Embodiments of the present invention will be described below with reference to the accompanying drawings. In the drawings, the same reference numerals indicate the same components. For ease of understanding, the scales of the drawings are modified in an appropriate manner.

The following description mainly describes three-phase reactors as examples, but the present invention is not limited to the three-phase reactors, and can be widely applied to multi-phase reactors that require constant inductance in each phase. The reactors according to the present disclosure can be applied to various types of equipment, and can be applied to the primary sides and secondary sides of inverters in industrial robots and machine tools.

A reactor according to a first embodiment will be described. FIG. 1 is a plan view of a reactor 101 according to the first embodiment, and shows the reactor when the base 2 is temporarily secured to an installation target object 100 in such an orientation that drawing directions of the cables (101*a* to 101*c* and 102*a* to 102*c*) are parallel with the direction of gravity. The reactor 101 according to the first embodiment includes a reactor main body 1 and a base 2.

The reactor main body 1 includes cores and coils wound on the cores. The reactor main body 1 has an approximately rectangular parallelepiped shape, and has input terminals 111*a* to 111*c* and output terminals 112*a* to 112*c* on its top surface. The input terminals 111*a* to 111*c* are connected to input cables 101*a* to 101*c*, respectively, by screws, etc., while the output terminals 112*a* to 112*c* are connected to output cables 102*a* to 102*c*, respectively, by screws, etc.

The base 2 has a polygonal shape extending outside the reactor main body 1, and supports the reactor main body 1. The base 2 as shown in FIG. 1 is rectangular in shape, but is not limited to this example, i.e., the base 2 may have an alternative polygonal shape, such as hexagonal, octagonal, etc. The base 2 is a plate member separate from the reactor main body 1, but can be secured thereto by screwing, etc.

In at least two sides that are not opposite each other (for example, a first side 3 and a second side 4), of a plurality of sides of the base 2, a plurality of notches (31, 32, 41, and 42) are formed inwardly from each of the sides, so that axes of fasteners (201 and 202) to temporarily secure the base 2 to the installation target object 100 pass through the notches (31, 32, 41, and 42).

The sides having the notches preferably include a plurality of sides that are not opposite each other (for example, the first side 3 and the second side 4) of first to fourth sides 3 to 6 of the base 2. In the example of FIG. 1, the base 2 has a rectangular shape having four sides (first to fourth sides 3 to 6). From among the four sides, the sides that are not opposite each other (for example, the first side 3 and the second side 4) have the notches (31, 32, 41, and 42). However, in addition to above, the sides that are opposite each other may each have a plurality of notches. In other words, the notches (31, 32, 41, and 42) are formed in the sides (for example, the first side 3 and the second side 4) that are not opposite each other, and notches (51 and 52) may be additionally formed in a third side 5 that is opposite the first side 3. Alternatively, the notches (31, 32, 41, and 42) are formed in the sides (for example, the first side 3 and the second side 4) that are not opposite each other, and notches (61 and 62) may be additionally formed in a fourth side 6 that is opposite the second side 4.

The notches (31 and 32) are formed inwardly from the first side 3 of the base 2. The fasteners (201 and 202), e.g., screws, etc., are temporarily secured to the installation target object 100, e.g., a wall, etc., so as to have space therebetween into which the base 2 fits. The fasteners (201 and 202) are disposed in positions corresponding to the positions of the notches (31 and 32). In FIG. 1, arrows A1 and A2 coincide with the direction of gravity. When the base 2 is slid down in the direction of the arrows A1 and A2, the axes of the fasteners 201 and 202 enter the notches 31 and 32. After that, the fasteners 201 and 202 are tightened to temporarily secure the base 2 to the installation target object 100. A method for securing the reactor 101 to the installation target object 100 will be described later.

Figure 2:
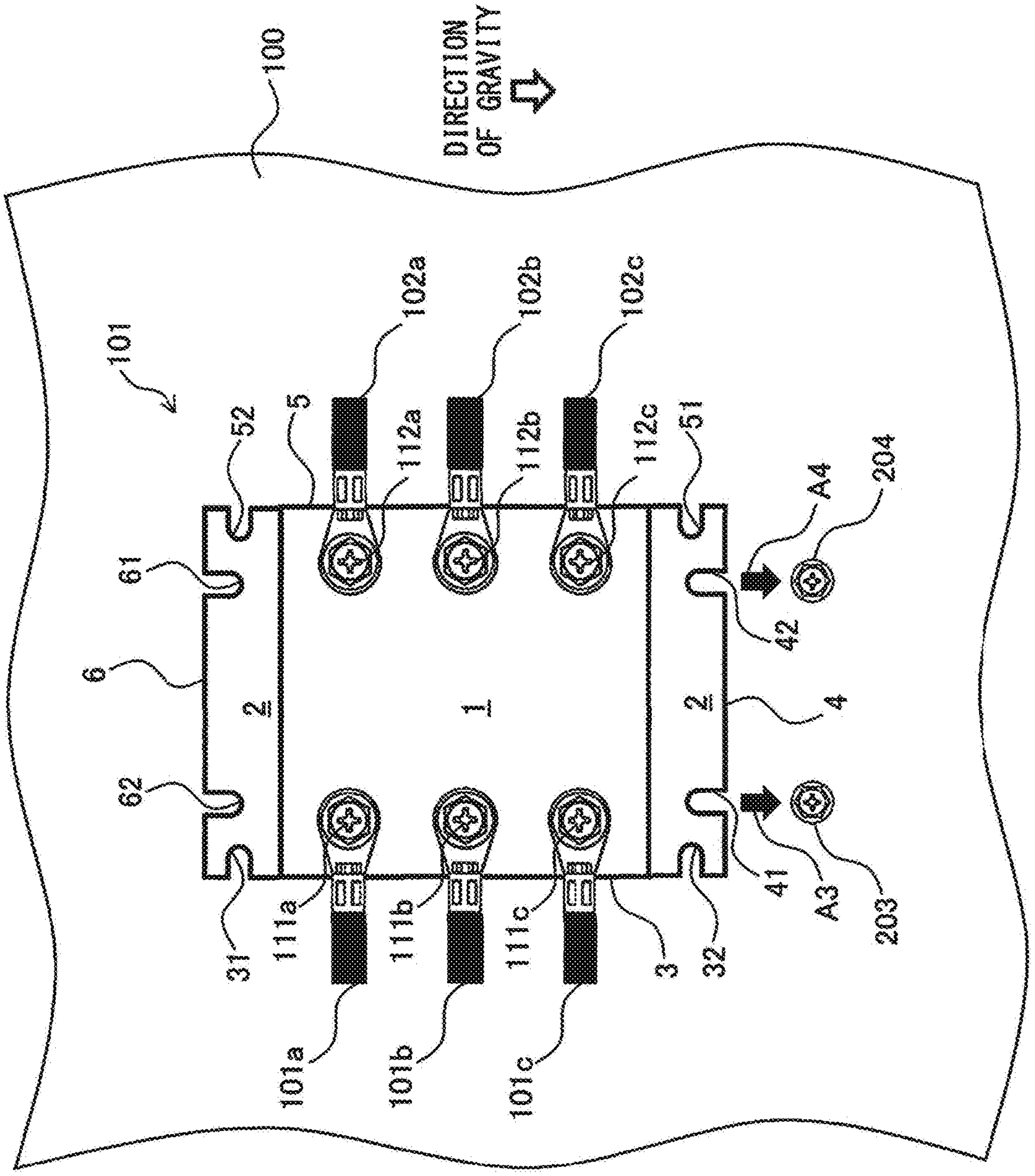
FIG. 2 is a plan view of the reactor according to the first embodiment, when the base is temporarily secured to the installation target object in such an orientation that the drawing directions of the cables are perpendicular to the direction of gravity.

FIG. 2 is a plan view of the reactor according to the first embodiment when the base is temporarily secured to the installation target object in such an orientation that the drawing directions of the cables are perpendicular to the direction of gravity. The notches (41 and 42) are formed inwardly from the second side 4 of the base 2. Fasteners (203 and 204), e.g., screws, etc., are temporarily secured to the installation target object 100, e.g., the wall, etc., so as to have space therebetween into which the base 2 fits. The fasteners (203 and 204) are disposed in positions corresponding to the positions of the notches (41 and 42). In FIG. 2, arrows A3 and A4 coincide with the direction of gravity. When the base 2 is slid down in the direction of the arrows A3 and A4, the axes of the fasteners 203 and 204 enter the notches 41 and 42. After that, the fasteners 203 and 204 are tightened to temporarily secure the base 2 to the installation target object 100.

As described above, forming the notches (31, 32, 41, and 42) in the sides that are not opposite each other (for example, the first side 3 and the second side 4) can improve the degree of flexibility in the orientation of the reactor when the reactor is secured to the installation target object. In other words, in the example of FIG. 1, the reactor 101 is secured to the installation target object 100 in such an orientation that the first side 3 faces downward, but, due to the provision of the notches in the second side 4, the reactor 101 can be secured to the installation target object 100 in such an orientation that the second side 4 faces downward.

As is apparent from FIGS. 1 and 2, when the reactor 101 is temporarily secured to the installation target object 100 in such an orientation that the first side 3 faces downward, the cables (101*a* to 101*c* and 102*a* to 102*c*) are drawn in vertical directions. On the other hand, when the reactor 101 is temporarily secured to the installation target object 100 in such an orientation that the second side 4 faces downward, the cables (101*a* to 101*c* and 102*a* to 102*c*) are drawn in horizontal directions. As described above, forming the notches (31, 32, 41, and 42) in the sides that are not opposite each other (for example, the first side 3 and the second side 4) can improve the degree of flexibility in the drawing directions of the cables connected to the reactor.

Furthermore, forming the notches (51 and 52) in the third side 5 that is opposite the first side 3 enables temporarily securing the reactor 101 to the installation target object 100 in such an orientation that the third side 5 faces downward. In the same manner, forming the notches (61 and 62) in the fourth side 6 that is opposite the second side 4 allows temporarily securing the reactor 101 to the installation target object 100 in such an orientation that the fourth side 6 faces downward. As described above, forming the notches in the opposite sides provides the secondary effect of enabling inversion of the reactor 101 in the vertical directions, when being temporarily secured to the installation target object 100. Furthermore, since the distance between the notches 31 and 32 of the first side 3 coincides with the distance between the notches 51 and 52 of the third side 5, the reactor 101 can be inverted in the vertical directions, without changing the positions of the fasteners 201 and 202 provided in the installation target object 100. The same is true for the notches (41 and 42) of the second side 4 and the notches (61 and 62) of the fourth side 6.

Figure 3A:
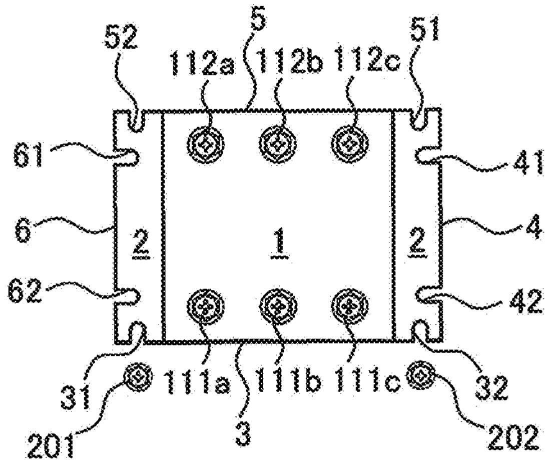
FIG. 3A is a plan view of the reactor according to the first embodiment, when notches formed in a lower side of the base are aligned with screws provided in the installation target object.
Figure 3B:
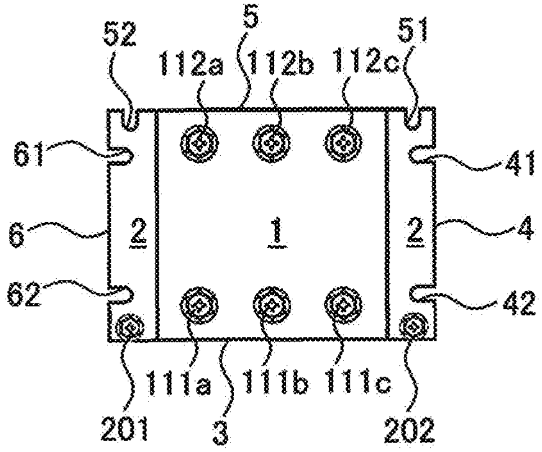
FIG. 3B is a plan view of the reactor according to the first embodiment, when the notches formed in the lower side of the base are temporarily secured to the screws provided in the installation target object.
Figure 3C:
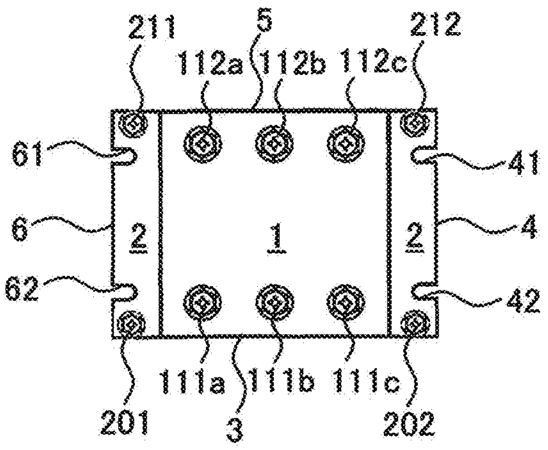
FIG. 3C is a plan view of the reactor according to the first embodiment, when the reactor is secured to the installation target object by screwing screws through notches formed in an upper side of the base.
Figure 4A:
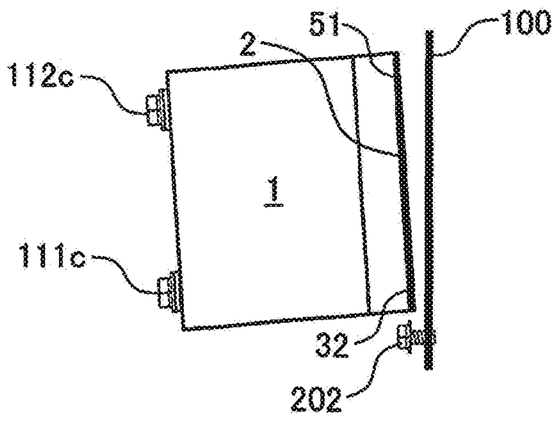
FIG. 4A is a side view of the reactor according to the first embodiment, when the notches formed in the lower side of the base are aligned with the screws provided in the installation target object.

Next, a method for securing a reactor to an installation target object will be described with reference to FIGS. 3A to 3C and 4A to 4C. FIGS. 3A and 4A are a plan view and a side view of the reactor according to the first embodiment, respectively, when the notches formed in the lower side of the base are aligned with the screws provided in the installation target object. FIGS. 3A to 3C omit the installation target object 100 and the cables. As shown in FIGS. 3A and 4A, the fasteners (201 and 202), e.g., screws, etc., are temporarily secured to the installation target object 100, e.g., a wall, etc., so as to have space therebetween into which the base 2 fits. The fasteners (201 and 202) are disposed in positions corresponding to the positions of the notches (31 and 32).

Figure 4B:
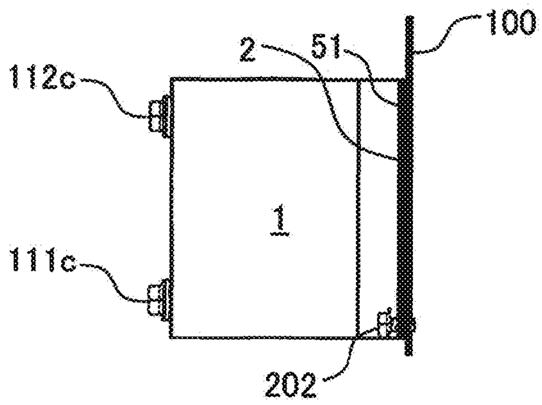
FIG. 4B is a side view of the reactor according to the first embodiment, when the notches formed in the lower side of the base are temporarily secured to the screws provided in the installation target object.

FIGS. 3B and 4B are a plan view and a side view of the reactor according to the first embodiment, respectively, when the notches formed in the lower side of the base are temporarily secured to the screws provided in the installation target object. By sliding the base 2 downward, the axes of the fasteners 201 and 202 enter the notches 31 and 32. After that, the fasteners 201 and 202 are tightened to temporarily secure the base 2 to the installation target object 100.

Figure 4C:
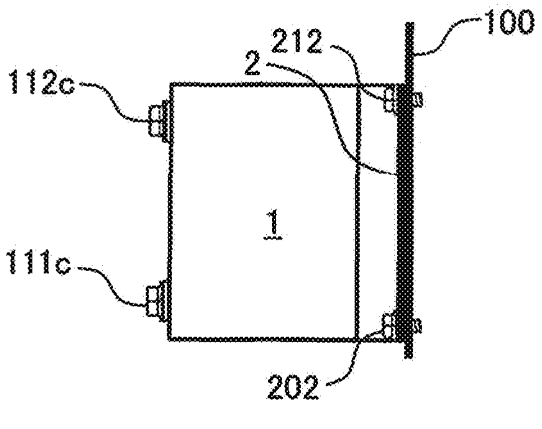
FIG. 4C is a side view of the reactor according to the first embodiment, when the reactor is secured to the installation target object by screwing the screws through the notches formed in the upper side of the base.

FIGS. 3C and 4C are a plan view and a side view of the reactor according to the first embodiment, respectively, when the reactor is secured to the installation target object by screwing screws through the notches formed in the upper side of the base. By tightening the upper fasteners 211 and 212, e.g., screws, etc., through the notches 51 and 52 of the third side 5, the reactor 101 is secured to the installation target object 100.

As described above, the reactor 101 can be secured to the installation target object 100 in such an orientation that the first side 3 faces downward. In the same manner, the reactor 101 can be secured to the installation target object 100 in such an orientation that each of the second to fourth sides 4 to 6 faces downward.

In the above embodiment, the notches (for example, 31 and 32) formed in each of the sides (first to fourth sides 3 to 6) are preferably formed so as to extend parallel with each other. By forming the notches in each side so as to extend parallel with each other, it is possible to alleviate the stress applied when the axes of the fasteners are passed through the notches.

Furthermore, the notches (31 and 32) are preferably formed in each of the sides in a direction perpendicular to the side (for example, the first side 3). By forming the notches in the direction perpendicular to each side, the reactor can be secured to the installation target object while keeping each side positioned horizontally, thus improving operating efficiency.

The notches (31 and 32) formed in each of the sides preferably include notches formed in the vicinities of both ends of the side (for example, the first side 3). In the above description, two notches are formed in each side as an example, but three or more notches may be formed in each side. However, even in such a case, since the notches are formed in the vicinities of both ends of each side, it is possible to improve stability when temporarily securing the reactor to the installation target object.

Figure 5:
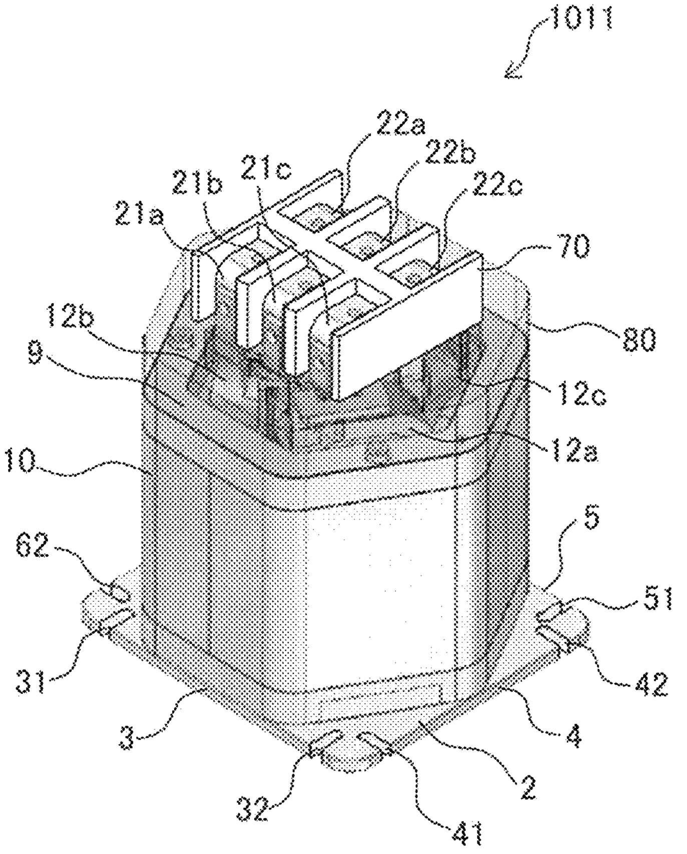
FIG. 5 is a perspective view of a reactor according to a first modification example of the first embodiment.
Figure 6:
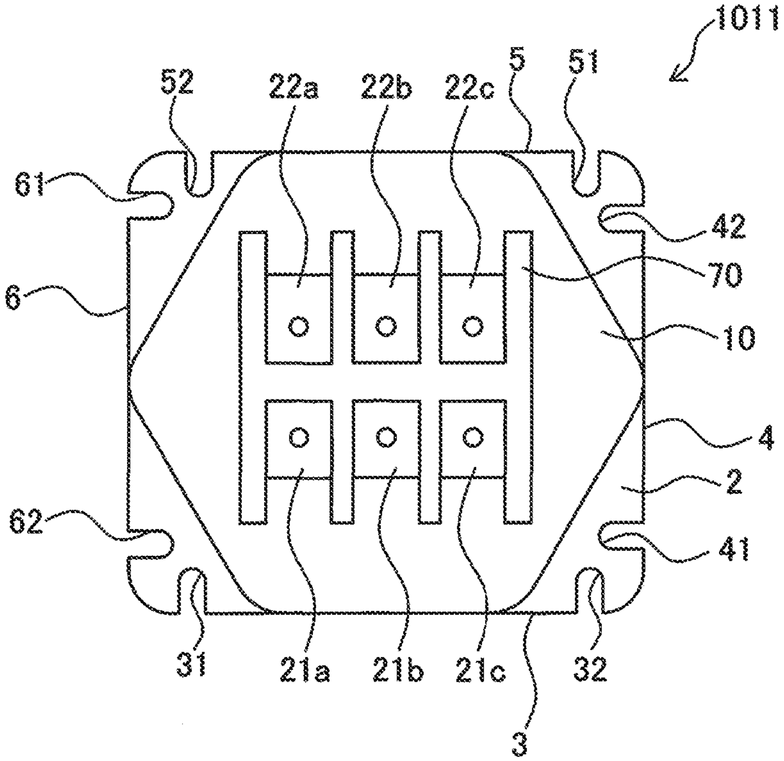
FIG. 6 is a plan view of the reactor according to the first modification example of the first embodiment.

In the above description, the reactor has a rectangular parallelepiped shape, and the base has a rectangular shape, but not limited to this example, the reactor and the base may have other shapes. FIGS. 5 and 6 are a perspective view and a plan view of a reactor 1011 according to a first modification example of the first embodiment, respectively. As shown in FIGS. 5 and 6, the reactor main body 10 may have a hexagonal cylindrical shape, and the base 2 may have a rectangular shape. Furthermore, a terminal base unit 80 may be provided on the outer peripheral iron core 9 so as to cover coils 12*a* to 12*c*. A terminal base 70 may be provided on the terminal base unit 80, and the terminal base 70 may include input terminals 21*a* to 21*c* and output terminals 22*a* to 22*c*. When the reactor 1011 is secured to an installation target object in such an orientation that the first side 3 or the third side 5 faces downward, the cables connected to the input terminal 21*a* to 21*c* and output terminals 22*a* to 22*c* can be drawn in vertical directions. On the other hand, when the reactor 1011 is secured to the installation target object in such an orientation that the second side 4 or the fourth side 6 faces downward, the cables connected to the input terminal 21*a* to 21*c* and the output terminals 22*a* to 22*c* can be drawn in horizontal directions.

Figure 7:
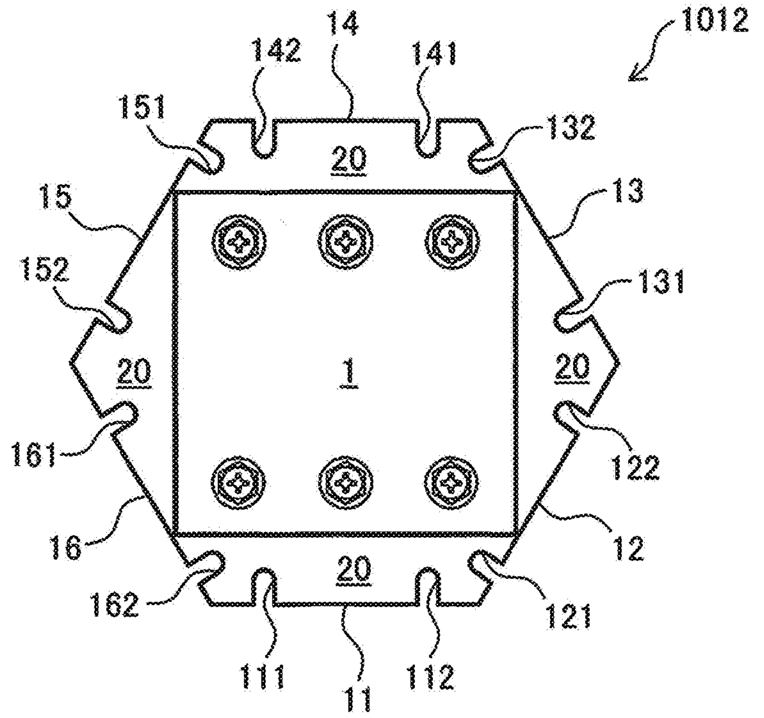
FIG. 7 is a plan view of a reactor according to a second modification example of the first embodiment.

In the above description, the base has a rectangular shape, by way of example, but may be a polygonal shape other than the rectangular shape, for example, hexagonal. FIG. 7 is a plan view of a reactor 1012 according to a second modification example of the first embodiment. As shown in FIG. 7, the base 20 of the reactor 1012 according to the second modification example has a hexagonal shape, and has a plurality of notches (111 and 112, 121 and 122, 131 and 132, 141 and 142, 151 and 152, and 161 and 162) in each side (11 to 16).

In the base 20 of a regular hexagonal shape, the position of the reactor 1012 is rotated by 60 degrees, whenever each of sides (12 to 16) faces downward, with respect to the position of the reactor 1012 secured to an installation target object with a side 11 facing downward. In other words, in a base of a regular polygonal shape having n number of corners, the reactor is rotated by 360/n degrees whenever the positions of the sides are changed in the reactor secured to an installation target object. Furthermore, by making uniform the distance between two notches provided in each side, the angle of the reactor can be changed without changing the positions of fasteners secured to the installation target object.

As described above, since the angle of the reactor can be finely adjusted, the angle of the reactor can be arbitrarily selected so as not to apply stress to the cables, in accordance with the position of an external device to which the cables drawn from the reactor are connected. As a result, it is possible to prevent a failure caused by breakage, a short circuit, etc. due to the stress related to the cables.

In FIG. 7, the two notches are formed in each of the sides 11 to 16 of the base 20, but the present invention is not limited to this example. In other words, notches may be provided just in positions required to rotate the reactor at a desired angle. For example, notches 121 and 122 formed in the side 12 are adequate for rotating a reactor main body 1 clockwise by 60 degrees with respect to the position of the reactor main body 1 of the reactor 1012 secured to the installation target object in such an orientation that the side 11 faces downward. However, as described above, providing the notches in the multiple sides allows for an increase in variations in the angles at which the reactor can be set.

Two notches are provided in each side in the description of the above embodiment, but three or more notches may be provided instead. For example, when the reactor is heavy and a heavy load is applied to the fasteners, the number of fasteners may be increased. The number of notches may be determined in accordance with the number of the fasteners.

Figure 8:
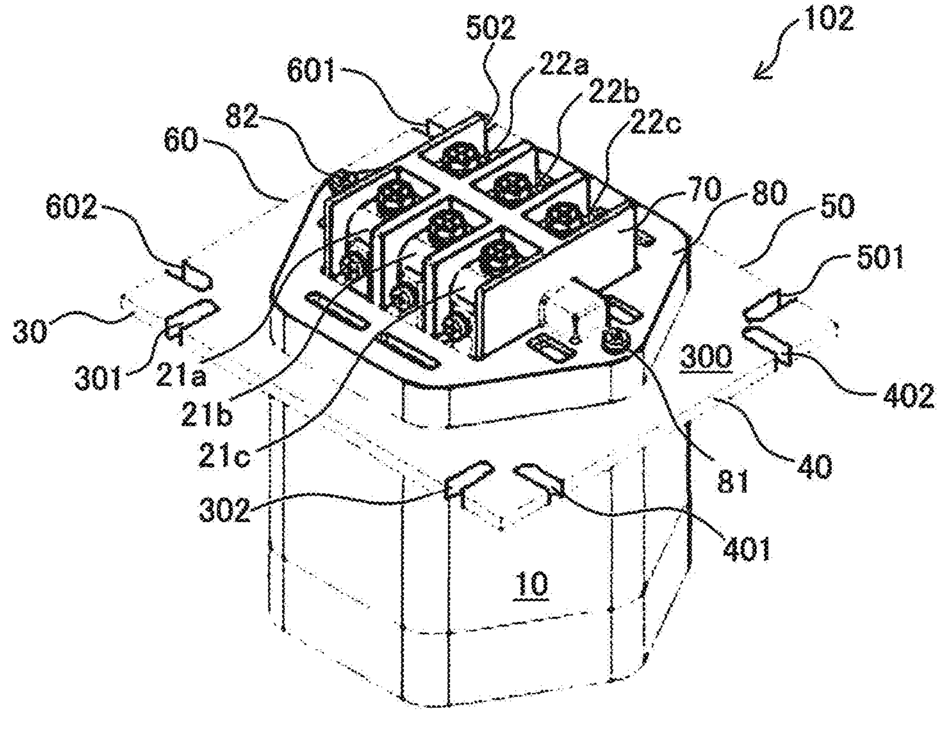
FIG. 8 is a perspective view of a reactor according to a second embodiment.

Next, a reactor according to a second embodiment will be described. FIG. 8 is a perspective view of the reactor according to the second embodiment. A reactor 102 according to the second embodiment includes a reactor main body 10, a terminal base 70, and an attachment fringe 300.

The reactor main body 10 includes cores and coils wound on the cores. The reactor main body 10 includes an outer peripheral iron core 9 constituted of a plurality of outer peripheral iron core portions, at least three iron cores coupled to the outer peripheral iron core portions, and coils (12*a*, 12*b*, and 12*c*) wound on the iron cores. The outer peripheral iron core 9 and the outer peripheral iron core portions are formed of laminations of iron sheets, carbon steel sheets, or electromagnetic steel sheets, ferrite, amorphous, or pressed powder cores.

A gap (not illustrated) is formed between one of the at least three iron cores and another of the iron cores, to be magnetically connectable therethrough. The number of the iron cores is preferably an integral multiple of 3.

The terminal base 70 is provided at a first end portion of the reactor main body 10 in an axial direction. The coils are connected to the terminal base 70. The terminal base 70 includes first connection portions (21*a*, 21*b*, and 21*c*) connected to input terminals (not illustrated) of the coils, and second connection portions (22*a*, 22*b*, and 22*c*) connected to output terminals (not illustrated) of the coils. For example, the coils 12_a_, 12_b_, and 12_c_ may be an R-phase coil, an S-phase coil, and a T-phase coil, respectively. However, the present invention is not limited to this example.

The first connection portions (21_a_, 21_b_, and 21_c_) have holes, and after the holes are aligned with holes formed in the input terminals (not illustrated), screws, etc. are fastened into the holes. In the same manner, the second connection portions (22_a_, 22_b_, and 22_c_) have holes, and after the holes are aligned with holes formed in the output terminals (not illustrated), screws, etc. are fastened into the holes.

The terminal base 70 is preferably integrated into a terminal base unit 80, which covers the coils disposed inside the reactor main body 10. The terminal base unit 80 is secured to the reactor main body 10 with securing fasteners (81 and 82).

The attachment fringe 300, which has a polygonal shape extending outside the reactor main body 10, is disposed between the terminal base 70 and the first end portion.

In at least two sides (for example, 30 and 40) that are not opposite each other, of a plurality of sides of the attachment fringe 300, a plurality of notches (301, 302, 401, and 402) are formed inwardly from each of the sides, so that fasteners to temporarily secure the attachment fringe 300 to an installation target object are passed through the notches (301, 302, 401, and 402). The plurality of sides (30 to 60) preferably include multiple sides (for example, 30 and 40) that are not opposite each other.

In the example of FIG. 8, the attachment fringe 300 has a rectangular shape. Notches (301 and 302, 401 and 402, 501 and 502, and 601 and 602) are formed in first to fourth sides 30 to 60 of the attachment fringe 300, respectively.

In FIG. 8, the attachment fringe 300 has a rectangular shape, but not limited to this example, may have a polygonal shape, e.g., a hexagonal shape, an octagonal shape, etc.

The notches (301 and 302, or 401 and 402) are preferably formed in each of the sides (30 and 40) so as to extend in parallel with each other. By forming the notches in each side so as to extend in parallel with each other, it is possible to alleviate the stress applied when the axes of the fasteners are passed through the notches.

The notches (301 and 302, or 401 and 402) are preferably formed in each of the sides (30 and 40) in a direction perpendicular to the side (30 or 40). By forming the notches in the direction perpendicular to each side, the reactor can be secured to the installation target object, while keeping each side positioned horizontally, thus improving operating efficiency.

The notches (301 and 302, or 401 and 402) formed in each of the sides (30 and 40) preferably include notches (301 and 302, or 401 and 402) formed in the vicinities of both ends of the side (30 or 40). In the above description, the two notches are formed in each side, as an example, but three or more notches may be formed in each side. However, even in such a case, since the notches are formed in the vicinities of both ends of each side, it is possible to improve stability in temporarily securing the reactor to the installation target object.

According to the reactors of the embodiments of the present disclosure, since the reactor can be temporarily secured in panel-mounting, irrespective of the orientation of the reactor, it is possible to reduce the number of man-hours involved in attachment of the reactor.

What is claimed is:

1. A reactor comprising:

a reactor main body including cores and coils would on the cores; and a base having a polygonal shape extending outside the reactor main body, configured to support the reactor main body, wherein in at least two sides that are not opposite teach other, of a plurality of sides of the base, a plurality of notches are formed inwardly from each of the sides, so that axes of fasteners to temporarily secure the base to an installation target object pass through the notches, wherein the plurality of notches point inwardly but perpendicular to each other on adjacent sides.

2. The reactor according to claim 1, wherein the notches are formed in each of the sides so as to extend in parallel with each other.

3. The reactor according to claim 1, wherein the notches are formed in each of the sides in a direction perpendicular to each of the sides.

4. The reactor according to claim 1, wherein the notches formed in each of the sides include notches formed in the vicinities of both ends of each of the sides.

5. A reactor comprising:

a reactor main body including cores and coils wound on the cores;

a terminal base provided at a first end portion of the reactor main body in an axial direction, the coils being connected to the terminal base; and an attachment fringe having a polygonal shape extending outside the reactor main body, the attachment fringe being disposed between the terminal base and the first end portion, wherein in at least two sides that are not opposite each other, of a plurality of sides of the attachment fringe, a plurality of notches are formed inwardly from each of the sides, so that fasteners to temporarily secure the attachment fringe to an installation target object pass through the notches, wherein the plurality of notches point inwardly but perpendicular to each other on adjacent sides.

6. The reactor according to claim 5, wherein the notches are formed in each of the sides so as to extend in parallel with each other.

7. The reactor according to claim 5, wherein the notches are formed in each of the sides in a direction perpendicular to each of the sides.

8. The reactor according to claim 5, wherein the notches formed in each of the sides include notches formed in the vicinities of both ends of each of the sides.

* * * * *